(12) United States Patent
Fischer et al.

(10) Patent No.: US 7,700,162 B2
(45) Date of Patent: Apr. 20, 2010

(54) METHOD FOR COATING GRAPHITE FOIL

(75) Inventors: Ludger Fischer, Wachtberg-Berkum (DE); Martin Christ, Augsburg (DE); Werner Langer, Altenmünster (DE)

(73) Assignee: SGL Carbon AG, Wiesbaden (DE)

( * ) Notice: Subject to any disclaimer, the term of this patent is extended or adjusted under 35 U.S.C. 154(b) by 637 days.

(21) Appl. No.: 11/642,212

(22) Filed: Dec. 20, 2006

(65) Prior Publication Data

US 2007/0160751 A1  Jul. 12, 2007

(30) Foreign Application Priority Data

Dec. 20, 2005  (EP) .................................. 05027846

(51) Int. Cl.
*B05D 1/04* (2006.01)
(52) U.S. Cl. ....................................... 427/485; 427/458
(58) Field of Classification Search ................. 427/485, 427/458
See application file for complete search history.

(56) References Cited

U.S. PATENT DOCUMENTS

| 3,903,328 | A | 9/1975 | Burdette, Jr. et al. |
| 6,503,626 | B1 * | 1/2003 | Norley et al. ............... 428/408 |
| 2002/0021997 | A1 * | 2/2002 | Taomoto et al. ............. 423/448 |
| 2002/0163076 | A1 | 11/2002 | Tzeng et al. |

* cited by examiner

*Primary Examiner*—Frederick J Parker
(74) *Attorney, Agent, or Firm*—Laurence A. Greenberg; Werner H. Stemer; Ralph E. Locher

(57) ABSTRACT

A method for applying a thin coating to a flat side (front side) and edge surfaces of a two-dimensional formation of graphite foil, includes applying the coating material to the flat side (front side) to be coated by electrostatic powder spraying followed by a sintering cycle or melting cycle. During the spraying, the two-dimensional formation is electrically contacted on a limited area virtually in the middle of its rear side, facing away from the spraying direction, on a limited area at a distance of at least 5 mm from the edges. A method for heat dissipation in electronic equipment, is also provided.

12 Claims, 3 Drawing Sheets

METHOD FOR COATING GRAPHITE FOIL

CROSS-REFERENCE TO RELATED APPLICATION

This application claims the priority, under 35 U.S.C. §119, of European Patent Application EP 05 027 845.6, filed Dec. 20, 2005; the prior application is herewith incorporated by reference in its entirety.

BACKGROUND OF THE INVENTION

Field of the Invention

The present invention relates to a method for coating two-dimensional formations of graphite foil with a protective or insulating layer covering one flat side and the edges.

Articles of graphite foil coated with protective or insulating layers of a thermoplastic and methods of applying such protective layers are known from U.S. Patent Application Publication No. US 2002/0163076A1. There, the coating of the graphite foil by laminating, rolling or adhesively applying foils of plastic is described in detail. Spray coating is mentioned as a possible alternative method, without any details of those methods being disclosed.

It is critical for all of the methods proposed that a small thickness (at most 0.025 mm) of the layer to be applied is desired. It is intended that such layer is to be uniformly thin over the entire surface to be coated and that, apart from at least one flat side of the article of graphite foil, the coating is to include the edge surfaces, which due to the thickness of the graphite foil, have heights of 0.25 to 1.5 mm.

Often a coating is only required on one of the flat sides of the article of graphite foil. For that variant, the flat side to be coated is referred to below as the front side, and by contrast therewith, the other, uncoated flat side is referred to as the rear side.

A coating carried out by the spraying method may, for example, be performed with a material in the form of a powder or a melt. If the edge surfaces are sprayed directly, an unavoidable overspray (excess application of material) on the front side of the workpiece causes not only increased material consumption but also an undesired increase in the thickness of the sprayed layer on the front side of the workpiece.

If the spraying process including the edge coating is to be automated, it is necessary for the spraying apparatus to have, in addition to the axes of movement in the x and y directions, i.e. parallel to the front side of the workpiece to be coated, an additional axis of movement in the z direction, parallel to the height (thickness) of the workpiece to be coated, for coating the edges.

SUMMARY OF THE INVENTION

It is accordingly an object of the invention to provide a spraying method for coating two-dimensional formations of graphite foil with a protective, insulating or other functional layer covering one flat side and edge surfaces, and a method for heat dissipation in electronic equipment, which overcome the hereinafore-mentioned disadvantages of the heretofore-known methods of this general type.

With the foregoing and other objects in view there is provided, in accordance with the invention, a method for applying a coating to a flat side (front side) and edge surfaces of a two-dimensional formation of graphite foil. The method comprises applying a coating material by electrostatic powder spraying in a spraying direction and, during the spraying step, electrically contacting approximately the middle of a rear side, facing away from the spraying direction, of the two-dimensional formation of graphite foil to be coated, on a limited area at a distance of at least 5 mm from the edges. A sintering cycle or melting cycle of the sprayed-on powder is performed.

Due to the layered structure of the graphite, the electrical conductivity in the plane of the foil is significantly higher than perpendicular to the plane of the foil. This anisotropy of the electrical conductivity of the graphite foil produces a field line pattern suitable for bringing about coating of the edge surfaces at the same time. Therefore, in the case of the method according to the invention, only two axes of movement (in the x and y directions) are required for the spraying device.

The technique of electrostatic powder coating as such is known to those skilled in the art. It is based on the fact that bodies with opposite electrical charge attract each other. An electric field forms between the spray head and the grounded workpiece. The powder particles follow the lines of flux of this field and remain adhering to the workpiece due to the residual charge. Therefore, the powder is deposited on the surface of the workpiece and forces itself into the smallest microfine irregularities of the surface.

In this state, the coated workpiece must be "baked" for a short time of about 15 to 30 minutes at 160 to 280° C. The temperature and duration of the so-called baking process depend on the composition of the coating which is chosen. During this process, there is a sintering together of sprayed-on particles or fusing together of the sprayed-on particles to form a highly viscous melt, so that a contiguous, uniform, continuous surface coating is obtained. The coated workpiece is subsequently left to cool.

The entire process described above, including the heating to the melting or sintering temperature, the holding time at this temperature and the subsequent cooling while the coating solidifies, is referred to herein as the sintering or melting cycle. Usually, layers produced in this way, for example on workpieces of metal, serve for corrosion protection or as a decorative layer. The typical layer thicknesses lie in a range of from 0.1 to 0.2 mm, in order to achieve the effects mentioned.

In principle, the same problems (overspray, necessity for a further axis of movement for the edge coating, etc.) as in the case of conventional spraying techniques are to be expected in the case of the electrostatic powder spraying technique. However, when coating two-dimensional formations of graphite foil, those problems can be avoided by the positioning and dimensioning of the electrical contact in the manner according to the invention.

The two-dimensional formations of graphite foil to be coated may, for example, be square or rectangular, but other geometrical forms are, of course, also possible, depending on the intended use.

The method according to the invention is used, for example, to provide two-dimensional formations of graphite foil that are used as heat dissipators (so-called heat spreaders or thermal interfaces) in electronic equipment with a protective layer which prevents graphite particles from breaking out, peeling off or flaking off from the surface or the edges of the graphite foil ("antiflaking" coating) and/or as an electrically insulating layer.

In accordance with another mode of the invention, the coating materials suitable for these purposes are, for example, thermoplastics such as polyethylene, polypropylene and polyester.

In accordance with a further mode of the invention, a further suitable coating material is boron nitride.

In accordance with an added mode of the invention, the layer thickness is only 5 to 10 μm, in order to ensure that heat transmission is impaired as little as possible. Layer thicknesses that are atypically low for electrostatic spraying methods can be achieved by a suitable selection of nozzles of a spray head and a rate of movement of the spray head.

In accordance with an additional mode of the invention, during the melting or sintering cycle, heating up takes place to a temperature between 160 and 280° C. This temperature is maintained for about 15 to 30 minutes.

In accordance with yet another mode of the invention, the coating material is a polymeric binder containing thermally conductive particles. A polymeric binder which contains thermally conductive particles is particularly preferred as a coating material.

In accordance with yet a further mode of the invention, the thermally conductive particles are preferably electrically non-conductive.

In accordance with yet an added mode of the invention, the particles are boron nitride contained in the polymeric binder in an amount of 1 to 15% by weight.

In accordance with yet an additional mode of the invention, the particles are, in particular, hexagonal boron nitride contained in the polymeric binder in an amount of 5 to 10% by weight.

With the objects of the invention in view, there is concomitantly provided a method for heat dissipation in electronic equipment. The method comprises using the two-dimensional formation of graphite foil coated by the method according to the invention.

Although the invention is illustrated and described herein as embodied in a method for coating graphite foil and a method for heat dissipation in electronic equipment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
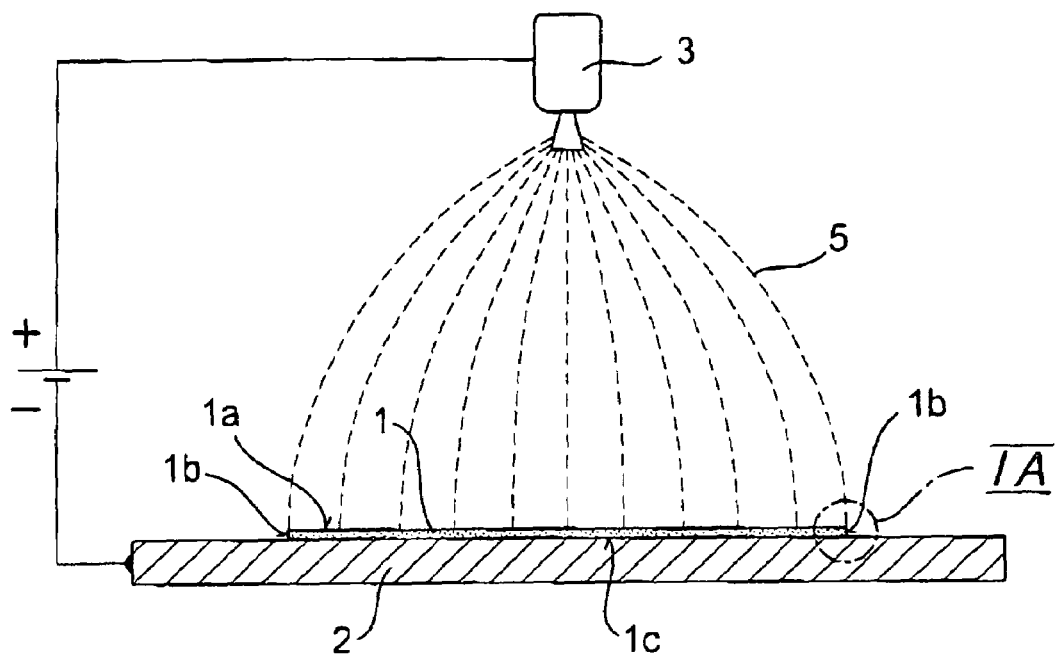
FIG. 1 is a schematic and longitudinal-sectional view showing a field line pattern which occurs in the case of area contacting of a rear side of a two-dimensional formation of graphite foil to be coated (comparative example 1)

Referring now to the figures of the drawings in detail and first, particularly, to FIG. 1 thereof, there is seen:

Example 1 (Comparative Example)

As is usual in the case of the known electrostatic powder coating technique, a two-dimensional or flat formation of graphite foil 1 to be coated is placed onto an underlying surface 2 which is connected in a conducting manner, or a counter electrode is connected by an alligator clip to an edge of the two-dimensional or flat formation 1 of graphite foil.

As a consequence of the electrical anisotropy of the graphite foil, a field line pattern 5 according to FIG. 1 forms between the graphite foil 1 and a spray head 3. The powder deposition therefore takes place exclusively on a front side 1a of the graphite foil, whereas edges Ib are not coated at the same time.

Figure 1A:
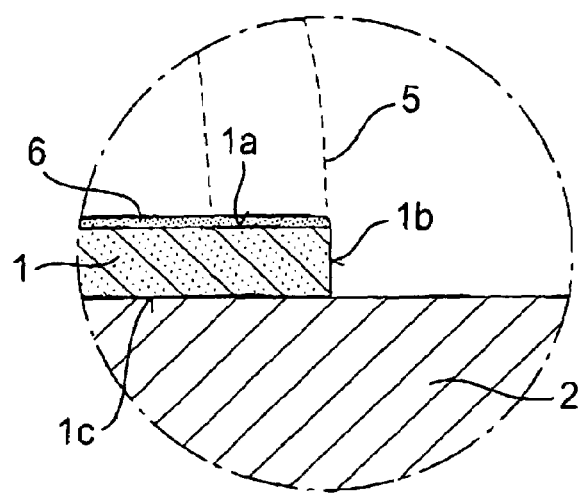
FIG. 1A is an enlarged view of a portion IA of FIG. 1 showing the field line pattern at an edge of the two-dimensional formation of graphite foil to be coated.

It is possible to avoid coating of the conducting underlying surface 2 at the same time, for example through the use of a non-conducting covering (which is not illustrated in FIG. 1 for the sake of clarity). A layer thickness of an applied coating 6 seen in FIG. 1A was approximately 10 μm.

Example 2 (Comparative Example)

A two-dimensional or flat workpiece 1' of metal is contacted at a point (contact 4) in the middle of a rear side 1c that is not to be coated. The underlying surface 2 is not conductive.

Figure 2:
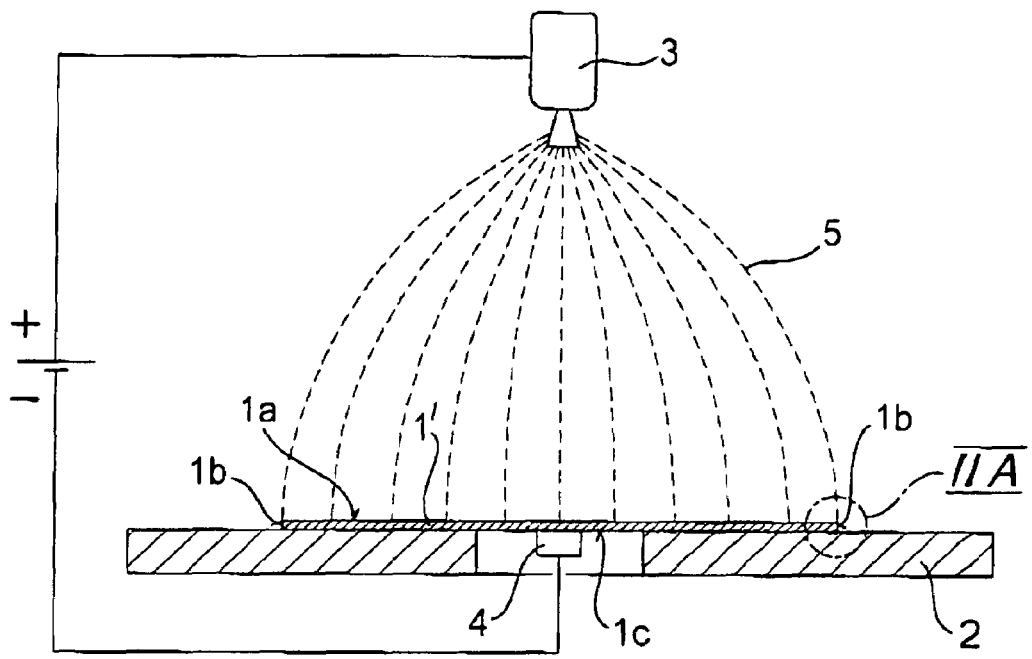
FIG. 2 is a view similar to FIG. 1 of the field line pattern which occurs in the case of point contacting approximately in the middle of the rear side of a two-dimensional workpiece of metal (comparative example 2)

Since the electrical conductivity is isotropic (independent of direction) in metals, the field line pattern 5 according to FIG. 2 results between the workpiece 1' and the spray head 3. Therefore, when an electrically isotropic workpiece 1' is sprayed onto perpendicularly, the edges 1b are not coated at the same time.

Figure 2A:
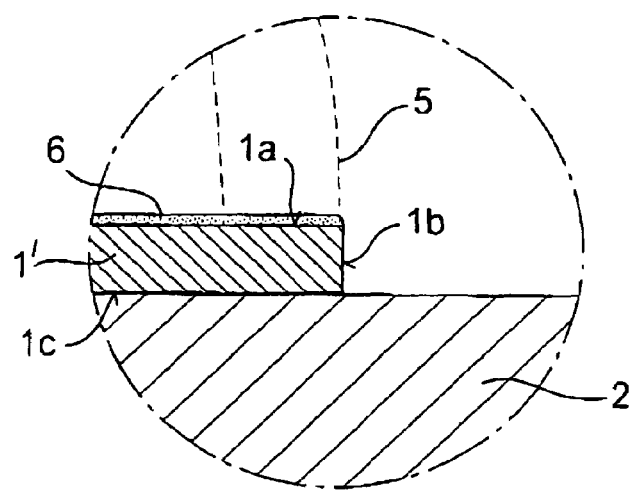
FIG. 2A is a view similar to FIG. 1A of a portion IIA of FIG. 2 showing the field line pattern at the edge of the two-dimensional workpiece of metal to be coated.

The layer thickness of the applied coating 6 shown in FIG. 2A was approximately 10 μm.

Example 3

Figure 3:
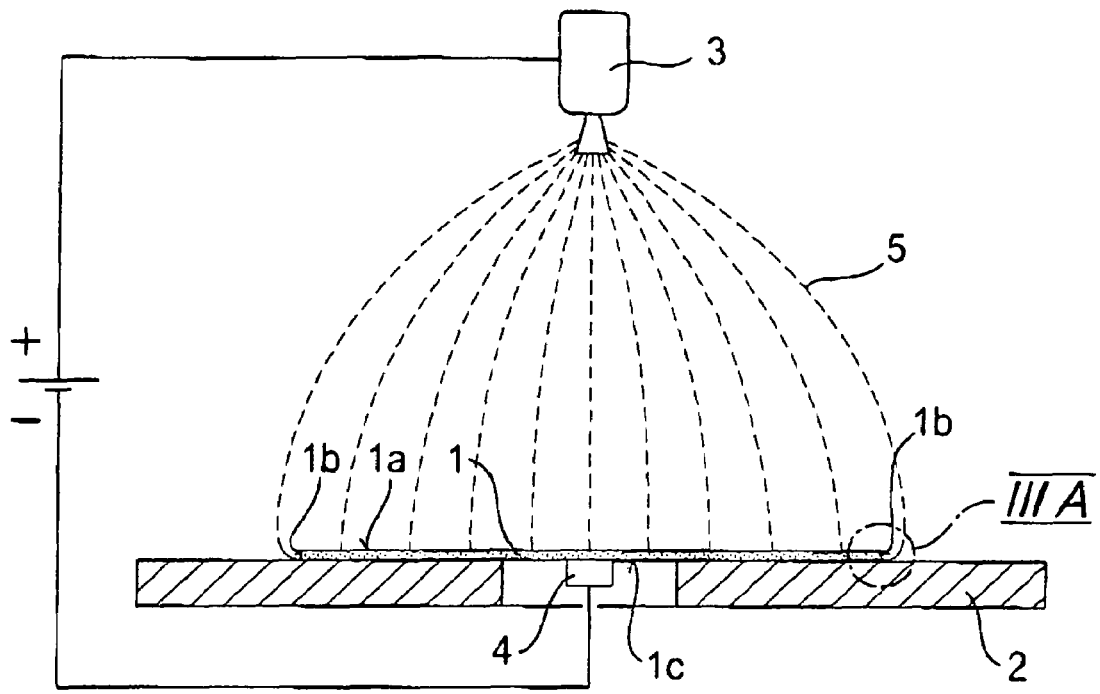
FIG. 3 is another view similar to FIGS. 1 and 2 of the field line pattern which occurs in the case of point contacting according to the invention approximately in the middle of the rear side of the two-dimensional formation of graphite foil to be coated (example 3)

According to the invention, a two-dimensional or flat formation of graphite foil 1 is contacted at a point (contact 4) approximately, virtually or substantially in the middle of the rear side 1c that is not to be coated, so that a field line pattern 5 according to FIG. 3 is produced as a consequence of the electrical anisotropy of the graphite foil. When the front side 1a is sprayed onto perpendicularly, coating of the edge surfaces 1b then takes place at the same time according to the invention. The underlying surface 2 is not conductive.

Figure 3A:
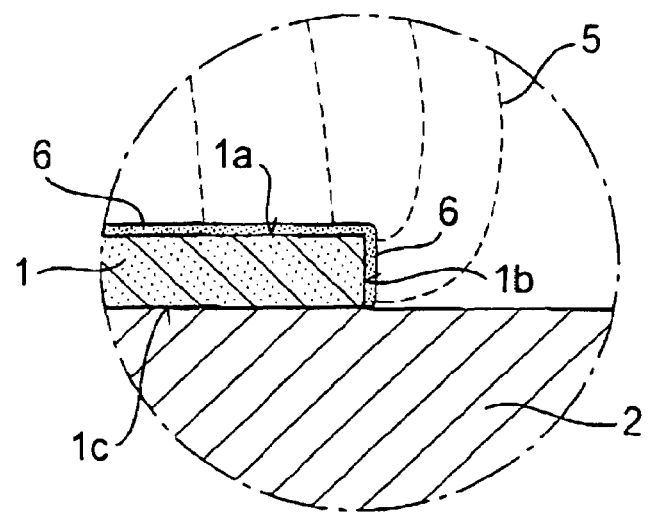
FIG. 3A is another view similar to FIGS. 1A and 2A of a portion IIIA of FIG. 3 showing the field line pattern at the edge of the two-dimensional formation of graphite foil to be coated.

The layer thickness of the applied coating 6 shown in FIG. 3A was approximately 10 μm.

Example 4

A polymeric-binder containing approximately 7% by weight of hexagonal boron nitride is used for the coating, which achieves an electrical insulation of the coated main side and the edges that prevents graphite particles from breaking out, peeling off or flaking off from the surface or the edges of the graphite foil ("antiflaking" coating). The thermal conductivity of the system is not appreciably impaired. In comparison with an uncoated graphite foil with a thermal conductivity perpendicular to the surface of 4.9 W/(m·K), a comparative sample coated according to the invention with a layer thickness of approximately 10 mµ shows a thermal conductivity perpendicular to the surface of 4.6 W/(m·K).

We claim:

1. A method for applying a coating to a flat front side and edge surfaces of a two-dimensional formation of graphite foil having an electrical conductivity in a surface plane of the foil being significantly higher than perpendicularly to the surface plane of the foil, the method comprising the following steps:
    applying a coating material by electrostatic powder spraying in a spraying direction;
    during the spraying step, electrically contacting approximately the middle of a rear side, facing away from the spraying direction, of the two-dimensional formation of graphite foil to be coated, on a limited area at a distance of at least 5 mm from the edges; and
    performing a sintering cycle or melting cycle of the sprayed-on powder.

2. The method according to claim 1, which further comprises applying the coating with a layer thickness of at most 10 µm.

3. The method according to claim 1, wherein the coating material is a thermoplastic.

4. The method according to claim 3, which further comprises selecting the coating material from the group consisting of polyethylene, polypropylene and polyester.

5. The method according to claim 1, which further comprises, during the sintering or melting cycle, heating to a temperature between 160 and 280° C. and maintaining that temperature for approximately 15 to 30 minutes.

6. The method according to claim 1, wherein the coating material is boron nitride.

7. The method according to claim 3, wherein the coating material is a polymeric binder containing thermally conductive particles.

8. The method according to claim 7, wherein the thermally conductive particles are electrically non-conductive.

9. The method according to claim 7, wherein the particles are boron nitride contained in the polymeric binder in an amount of 1 to 15% by weight.

10. The method according to claim 8, wherein the particles are boron nitride contained in the polymeric binder in an amount of 1 to 15% by weight.

11. The method according to claim 9, wherein the particles are hexagonal boron nitride contained in the polymeric binder in an amount of 5 to 10% by weight.

12. The method according to claim 10, wherein the particles are hexagonal boron nitride contained in the polymeric binder in an amount of 5 to 10% by weight.

* * * * *